(12) United States Patent
O'Kelley

(10) Patent No.: US 11,184,677 B2
(45) Date of Patent: Nov. 23, 2021

(54) BROADCAST STREAMING SYSTEM AND METHOD OF USE

(71) Applicant: Kaley K. O'Kelley, Colleyville, TX (US)

(72) Inventor: Kaley K. O'Kelley, Colleyville, TX (US)

( * ) Notice: Subject to any disclaimer, the term of this patent is extended or adjusted under 35 U.S.C. 154(b) by 0 days.

(21) Appl. No.: 16/358,297

(22) Filed: Mar. 19, 2019

(65) Prior Publication Data

US 2019/0289365 A1    Sep. 19, 2019

Related U.S. Application Data

(60) Provisional application No. 62/644,953, filed on Mar. 19, 2018.

(51) Int. Cl.
| | |
|---|---|
| *H04N 21/218* | (2011.01) |
| *H04N 21/4223* | (2011.01) |
| *H04N 21/4788* | (2011.01) |
| *H04N 21/482* | (2011.01) |
| *H04L 12/08* | (2006.01) |
| *H04L 12/18* | (2006.01) |
| *H04L 12/58* | (2006.01) |
| *H04L 29/06* | (2006.01) |
| *H04L 29/08* | (2006.01) |

(52) U.S. Cl.
CPC ..... *H04N 21/4788* (2013.01); *H04N 21/4223* (2013.01); *H04N 21/482* (2013.01); *H04L 67/10* (2013.01)

(58) Field of Classification Search
CPC ............. H04N 21/4788; H04N 21/482; H04N 21/4223
See application file for complete search history.

(56) References Cited

U.S. PATENT DOCUMENTS

| | | | |
|---|---|---|---|
| 8,107,977 B2* | 1/2012 | Olague | H04N 21/235 455/466 |
| 10,747,422 B2* | 8/2020 | Witkowski | A63F 13/87 |
| 2005/0262542 A1* | 11/2005 | DeWeese | H04L 12/1818 725/106 |
| 2006/0259923 A1* | 11/2006 | Chiu | H04N 5/44543 725/24 |

\* cited by examiner

*Primary Examiner* — Hsiungfei Peng
(74) *Attorney, Agent, or Firm* — Leavitt Eldredge Law Firm

(57) ABSTRACT

A system and method of streaming one or more broadcast sources includes receiving the broadcast sources from a cloud based content management system; providing options of broadcast sources to a user via a computing device, the computing device having a screen; receiving a selection from the user of the options of broadcast sources; presenting the selection to the user; and providing the user with a chat interface to receive comments from the user and provide the user with one or more comments made by secondary users.

5 Claims, 4 Drawing Sheets

BROADCAST STREAMING SYSTEM AND METHOD OF USE

BACKGROUND

1. Field of the Invention

The present invention relates generally to news broadcasting systems, and more specifically, to a broadcast streaming system for streaming a plurality of broadcasts to a user via a computing device, wherein the user has independent and customizable control over the streaming of the plurality of broadcasts.

2. Description of Related Art

Broadcast systems are well known in the art and are effective means to receive news and entertainment. For example, it is a common practice to watch news stations, sporting events and the like, either on TV or through the internet. In addition, it is common for users to share broadcast feeds with others on social media for their friends to comment on and share.

One of the problems commonly associated with conventional broadcast systems is customizable streaming. For example, a user may desire to watch two sporting events at one, or multiple news stations at one. In these situations, the user must switch back and forth between various broadcasting sources.

In addition, today's world revolves around online social interactions, conventional methods of watching and receiving news and entertainment do not easily and efficiently facilitate social networking and communication about broadcast streams.

Accordingly, although great strides have been made in the area of broadcast streaming, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
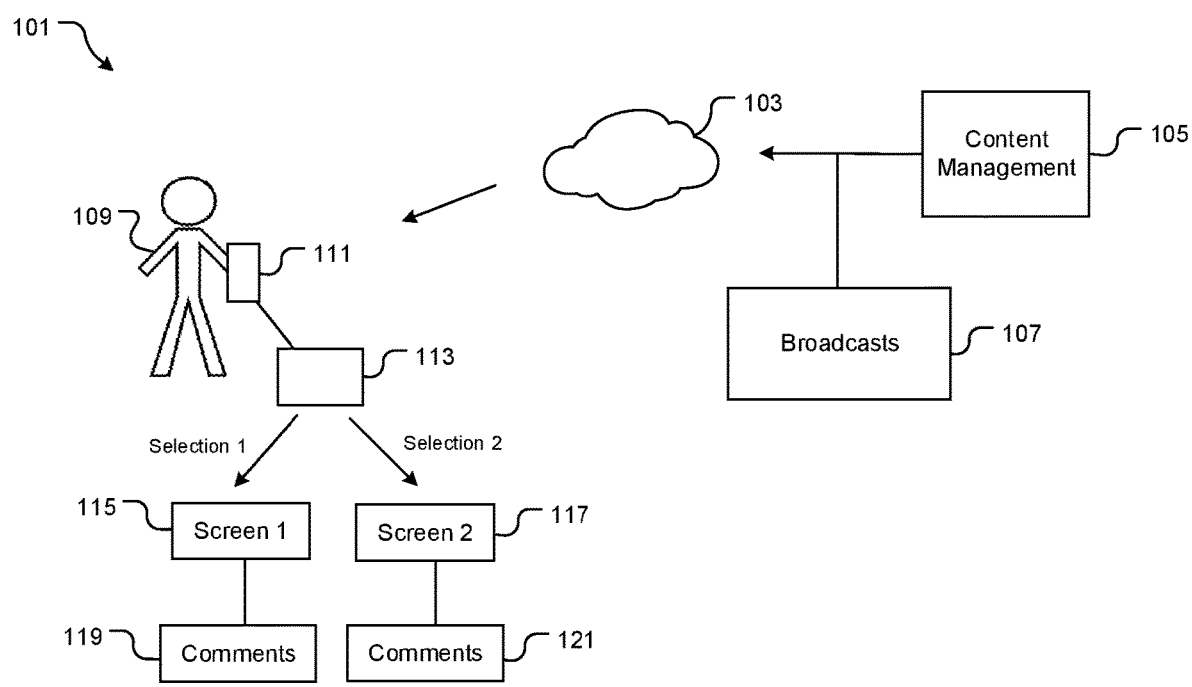
FIG. 1 is a simplified schematic of a broadcast system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional broadcast streaming systems. Specifically, the present invention provides a means for users to stream multiple sources onto one device, while further allowing for the user to comment on the streaming, providing for social interaction. In addition, the present invention provides customization options for the user. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of a broadcast streaming system 101 in accordance with a preferred embodiment of the present application. It will be appreciated that system 101 overcomes one or more of the above-listed problems commonly associated with conventional broadcast streaming systems.

In the contemplated embodiment, system 101 includes a network 103 configured to facilitate streaming and communication. In the preferred embodiment, a content management system 105 designates a plurality of broadcast streaming sources 107 to be provided to a user 109 via a computing device 111 and a streaming platform 113. It should be appreciated that the computing device 111 can be a smart phone, a computer, a tablet, a smart TV, or any other computing device having a display to stream to.

In the preferred embodiment, the platform 113 provides the user with a selection of broadcast streams, wherein the user can select one or more streams to be presented on the computing device display. For example, the user can select two broadcast streams, wherein both are presented on the display in the form of two screens 115, 117, thereby allowing for the user to watch both broadcasts at once. Further, in the preferred embodiment, platform 113 provides the user with the option to comment 119, 121 on the streaming broadcasts, wherein the comments are shared with other secondary users. This allows multiple users of platform 113 to interact via chat/comments relating to the streaming.

Figure 2:
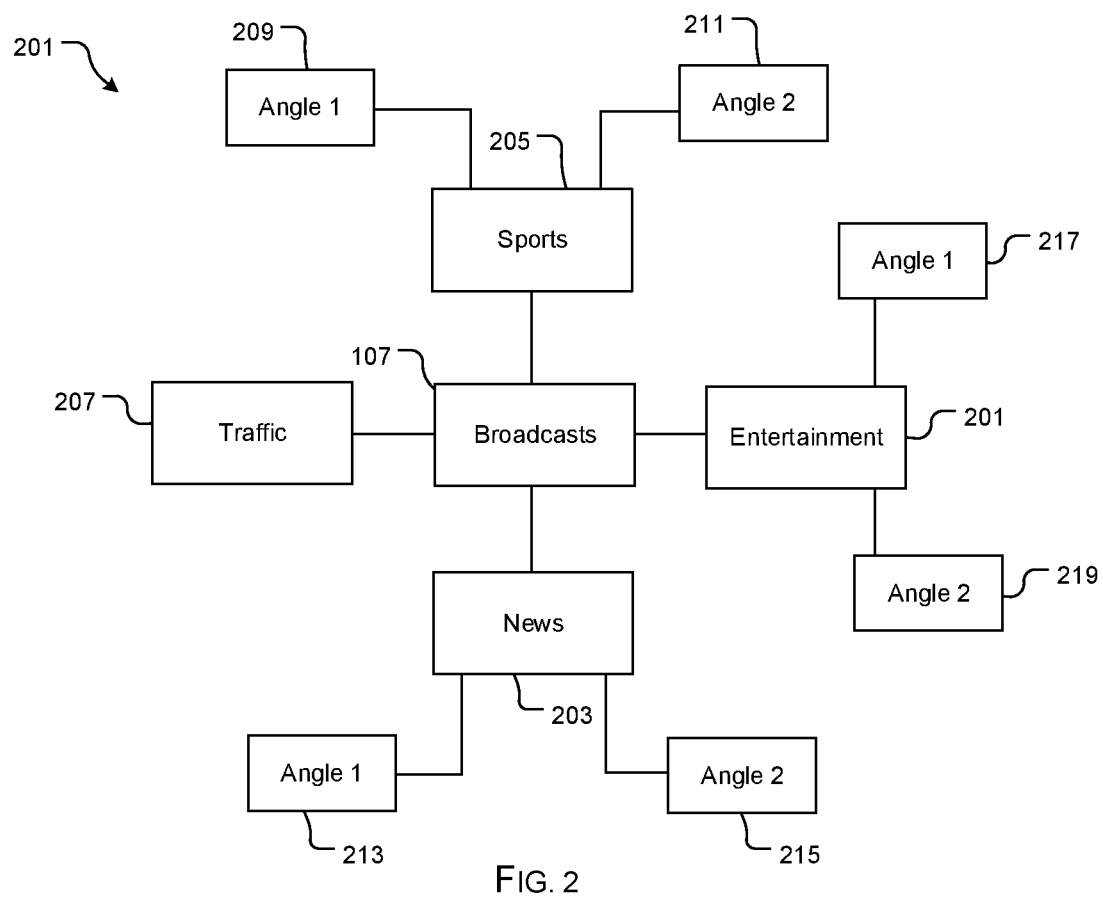
FIG. 2 is a simplified schematic of examples of broadcast sources of FIG. 1.

In FIG. 2 a simplified schematic further depicts an example of broadcast sources 107 contemplated for the present application. Contemplated sources include entertainment 201, news stations 203, sports programs 205, and traffic programs 207. The user can select a traffic and news station to watch simultaneously.

Further, in some embodiments, the availability of broadcast streaming can include multiple cameras/angles associated with various events, programs. For example, sports programs 205 commonly include multiple camera angles 209, 211, such as from a quarterback angle, wide receiver angle, etc. This allows the user to customize their streaming experience. Similarly, users can be provided with multiple angles 213, 215 for a newscast, such as traffic, weather, on-site, in studio, and the like. The same can be used for other entertainment sources, such as talk-shows, award shows, or any other entertainment, wherein multiple camera angles 217, 219 can be used.

Figure 3:
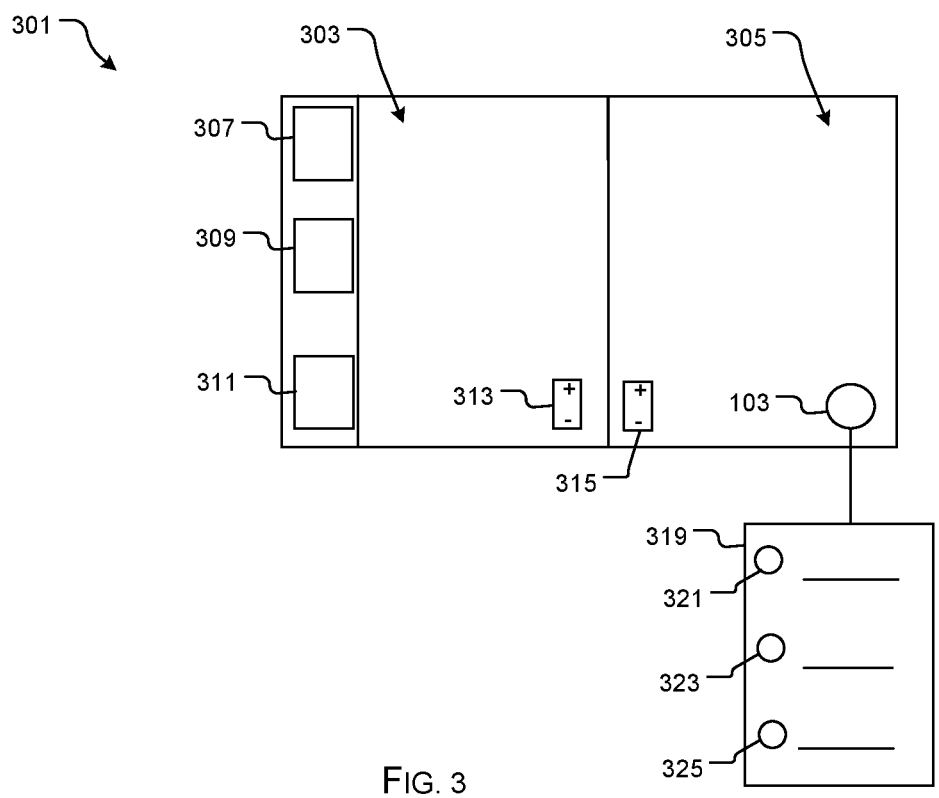
FIG. 3 is a simplified schematic of a user interface of FIG. 1.

In FIG. 3, a simplified schematic further depicts an interface 301 of platform 113. In this exemplary embodiment, two screens 303, 305 are shown, wherein two different broadcast sources are streamed. It must be understood that more screens, depending on the size of the display, can be presented to the user. In addition, the user can customize, through interaction with interface 301 the size and positioning of the screens.

Interface 301 further includes options 307, 309, 311 wherein the user can select the options to show or change out the streams. For example, the user can drag and drop option 307 over the top of screen 303, wherein option 307 takes over screen 303.

Further, independent commands 313, 315 are incorporated into interface 301, allowing for the user to control volume and the like of each screen 303, 305. As previously discussed, interface 301 further includes a chat/comment portal 317, wherein the user can open another interface 319 to comment and chat with secondary users 321, 323, 325. This feature allows for users to interact and comment on news, games, and other entertainment.

It should be appreciated that one of the unique features believed characteristic of the present application is the combining of a system to stream multiple broadcast sources to a device, in connection with the ability to allow users to comment/chat about the streams.

Figure 4:
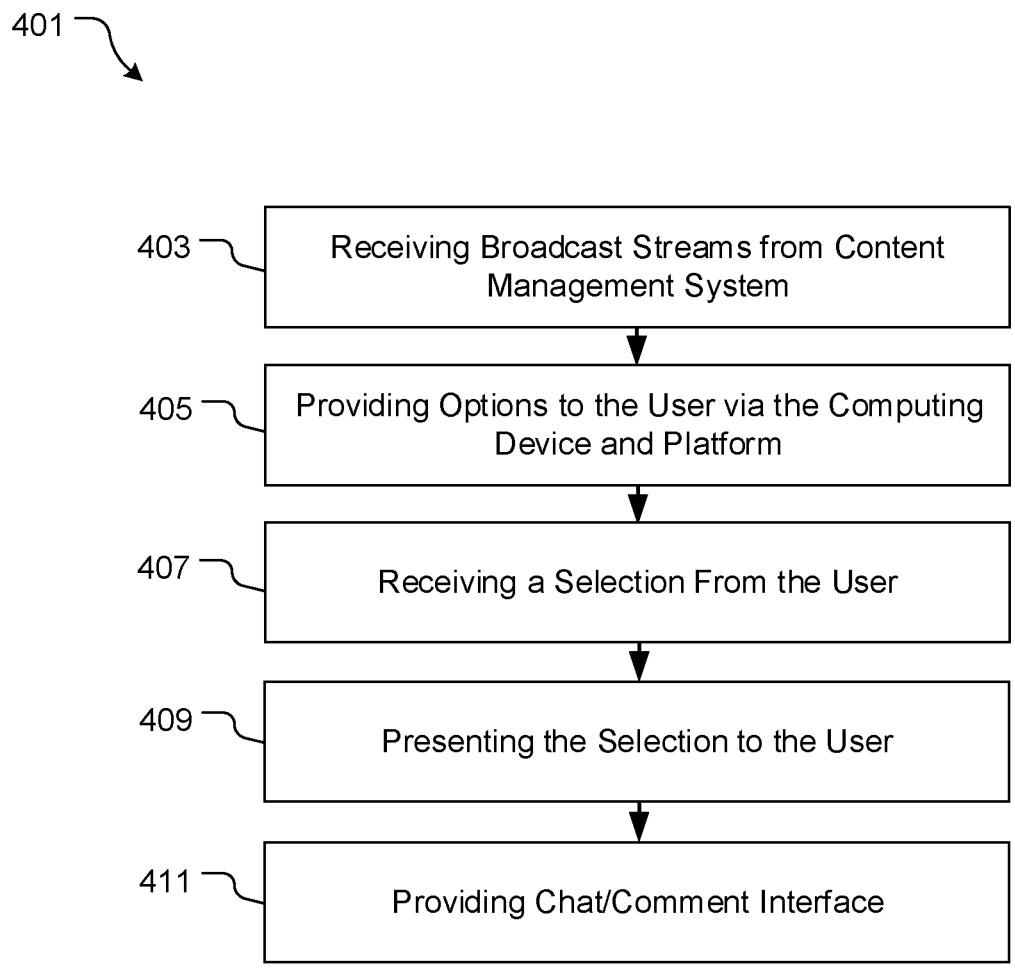
FIG. 4 is a flowchart of the method of use of the system of FIG. 1.

In FIG. 4, a flowchart 401 depicts a method of use of system 101. During use, the content management system controls broadcast sources and appearance of the streaming platform, as shown with box 403. The user is provided with options via the platform and interface, wherein the user can select one or more broadcast sources to stream, as shown with boxes 405, 407. The user can then watch multiple sources on the same screen, or multiple camera angles of the same source, as shown with box 409. As desired, the user can comment and/or chat through the platform with other secondary user's streaming the same source, as shown with box 411.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A broadcast streaming system, comprising:
a network configured to connect to a plurality of broadcast sources, the plurality of broadcast sources includes one or more of:
a first camera stream from the broadcast source; and
a second camera stream from the broadcast source;
wherein the interactive display is configured to display simultaneously a first image from the first camera and a second image from the second camera;
a first computing device configured to communicate with the network;
a streaming platform accessible via the first computing device and configured to: connect to the network to access the plurality of broadcast sources;
the streaming platform is configured to provide options of the plurality of broadcast sources to a user of the first computing device;
an interactive display in communication with the streaming platform, the interactive display having a plurality of selection options positioned on a first end of the display, the plurality of selection options is configured to receive a selection from the user regarding the options of the plurality of broadcast sources;
the interactive display having a second end opposing the first end, a plurality of chat panels on the second end, the plurality of chat panels is configured to provide the user with a chat interface to receive and provide comments to and from the user with one or more secondary users;
the interactive display has a first screen and a second screen, the first screen is configured to display a first angle of a broadcast from the plurality of broadcast sources via the first camera, the second screen is configured to display a second angle of the broadcast via the second camera, the first angle is different from the second angle, the first angle and the second angle are from different cameras and simultaneously broadcast; and
the interactive display has an input device configured to display a comment on the broadcast source;
wherein the user selects between the first angle and the second angle for viewing of the first image and the second image via the respective first camera and the second camera.

2. The system of claim 1, wherein the plurality of broadcast sources are determined via a cloud-based content management system.

3. The system of claim 1, wherein the plurality of broadcast sources includes one or more of:
a news broadcast;
an entertainment source broadcast; a sports program broadcast; and
a traffic report broadcast.

4. A method of streaming one or more broadcast sources of a plurality of broadcast sources, the method comprising:
   providing the system of claim 1;
   receiving the plurality of broadcast sources from a cloud based content management system;
   providing options of the plurality of broadcast sources to a user via a computing device, the computing device having a screen;
   receiving a selection from the user of the options of the plurality of broadcast sources;
   presenting the selection to the user via the screen of the first computing device; and
   providing the user with a chat interface configured to receive comments from the user and provide the user with one or more comments made by secondary users.

5. The method of claim 4, further comprising:
   providing the user with streaming of at least two sources; and
   proving the user with independent controls for the at least two sources.

\* \* \* \* \*